US012670009B2

(12) United States Patent
Sawal et al.

(10) Patent No.: US 12,670,009 B2
(45) Date of Patent: Jun. 30, 2026

(54) WORKLOAD PRIORITIZATION IN A CLOUD ENVIRONMENT

(71) Applicant: Dell Products L.P., Round Rock, TX (US)

(72) Inventors: Vinay Sawal, Fremont, CA (US);
Sithiqu Shahul Hameed, Chennai (IN);
Joseph LaSalle White, San Jose, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 418 days.

(21) Appl. No.: 18/363,903

(22) Filed: Aug. 2, 2023

(65) Prior Publication Data

US 2025/0045086 A1 Feb. 6, 2025

(51) Int. Cl.
*G06F 9/455* (2018.01)
(52) U.S. Cl.
CPC .. *G06F 9/45558* (2013.01); *G06F 2009/4557* (2013.01)
(58) Field of Classification Search
CPC .............................. G06F 9/45558; G06F 9/4558
See application file for complete search history.

(56) References Cited

U.S. PATENT DOCUMENTS

| | | | | |
|---|---|---|---|---|
| 9,354,960 | B2 * | 5/2016 | Suit ...................... | G06F 11/3442 |
| 10,452,436 | B2 * | 10/2019 | Kumar ................ | G06F 11/3428 |
| 10,761,934 | B2 * | 9/2020 | Mohanta ................. | H04L 67/10 |
| 11,822,953 | B2 * | 11/2023 | Perneti .................. | G06F 9/4893 |
| 2012/0167083 | A1 * | 6/2012 | Suit ..................... | G06F 11/0712 718/1 |
| 2014/0047444 | A1 * | 2/2014 | Yamaguchi ........... | G06F 9/5077 718/1 |
| 2015/0007173 | A1 * | 1/2015 | Ionescu ............... | G06F 9/45533 718/1 |
| 2016/0062782 | A1 * | 3/2016 | Liu ...................... | G06F 9/45558 718/1 |
| 2017/0060627 | A1 * | 3/2017 | Birkestrand ........ | G06F 9/45558 |
| 2017/0331845 | A1 * | 11/2017 | Keohane ............. | H04L 63/1425 |

(Continued)

OTHER PUBLICATIONS

Wikipedia, "Mahalanobis distance," https://en.wikipedia.org/wiki/Mahalanobis_distance, Retrieved from the Internet: Jun. 28, 2023.

(Continued)

*Primary Examiner* — Lewis A Bullock, Jr.
(74) *Attorney, Agent, or Firm* — Amin, Turocy & Watson, LLP

(57) ABSTRACT

The technology described herein is directed towards workload prioritization (ranking) in a cloud (e.g., private/hybrid) environment based on multi-criteria decision analysis using Mahalanobis distance-based variance-covariance matrix that takes into account the pair-wise correlation between criteria attributes from a dataset. The technology described herein calculates relative closeness values for alternatives (e.g., virtual machines), and can perform a final ranking of a group of virtual machines based on their associated relative closeness values. The workload prioritization process can be incorporated into a decision engine. The decision engine can be used in various use cases, including backup prioritization, shutdown prioritization during power failures, workflow scheduling prioritization, and the like.

20 Claims, 22 Drawing Sheets

(56) References Cited

U.S. PATENT DOCUMENTS

| | | | | |
|---|---|---|---|---|
| 2019/0354438 A1* | 11/2019 | Mohanta | ............. | G06F 11/1092 |
| 2021/0011625 A1* | 1/2021 | Samad | .................... | G06F 3/067 |
| 2022/0318041 A1* | 10/2022 | Perneti | ............... | G06F 9/45558 |
| 2023/0393882 A1* | 12/2023 | Goud | .................... | G06F 16/188 |

OTHER PUBLICATIONS

Wikipedia, "Topsis," https://en.wikipedia.org/wiki/TOPSIS, Retrieved from the Internet: Jun. 28, 2023.

* cited by examiner

330

|  | $c_1$ | $c_2$ | $c_3$ | $c_4$ | ... | $c_m$ |
|---|---|---|---|---|---|---|
| $v_1$ | $x_{11}$ | $x_{12}$ | $x_{13}$ | $x_{14}$ | ... | $x_{1m}$ |
| $v_2$ | $x_{21}$ | $x_{22}$ | $x_{23}$ | $x_{24}$ | ... | $x_{2m}$ |
| $v_3$ | $x_{31}$ | $x_{32}$ | $x_{33}$ | $x_{34}$ | ... | $x_{3m}$ |
| $v_4$ | $x_{41}$ | $x_{42}$ | $x_{43}$ | $x_{44}$ | ... | $x_{4m}$ |
| $v_5$ | $x_{51}$ | $x_{52}$ | $x_{53}$ | $x_{54}$ | ... | $x_{5m}$ |
| $v_6$ | $x_{61}$ | $x_{62}$ | $x_{63}$ | $x_{64}$ | ... | $x_{6m}$ |
| $v_7$ | $x_{71}$ | $x_{72}$ | $x_{73}$ | $x_{74}$ | ... | $x_{7m}$ |
| $v_8$ | $x_{81}$ | $x_{82}$ | $x_{83}$ | $x_{84}$ | ... | $x_{8m}$ |
| ... | ... | ... | ... | ... | ... | ... |
| $v_n$ | $x_{n1}$ | $x_{n2}$ | $x_{n3}$ | $x_{n4}$ | ... | $x_{nm}$ |

| | $c_1$ | $c_2$ | $c_3$ | $c_4$ | $\cdots$ | $c_m$ |
|---|---|---|---|---|---|---|
| $v_1$ | $w_{11}$ | $w_{12}$ | $w_{13}$ | $w_{14}$ | $\cdots$ | $w_{1m}$ |
| $v_2$ | $w_{21}$ | $w_{22}$ | $w_{23}$ | $w_{24}$ | $\cdots$ | $w_{2m}$ |
| $v_3$ | $w_{31}$ | $w_{32}$ | $w_{33}$ | $w_{34}$ | $\cdots$ | $w_{3m}$ |
| $v_4$ | $w_{41}$ | $w_{42}$ | $w_{43}$ | $w_{44}$ | $\cdots$ | $w_{4m}$ |
| $v_5$ | $w_{51}$ | $w_{52}$ | $w_{53}$ | $w_{54}$ | $\cdots$ | $w_{5m}$ |
| $v_6$ | $w_{61}$ | $w_{62}$ | $w_{63}$ | $w_{64}$ | $\cdots$ | $w_{6m}$ |
| $v_7$ | $w_{71}$ | $w_{72}$ | $w_{73}$ | $w_{74}$ | $\cdots$ | $w_{7m}$ |
| $v_8$ | $w_{81}$ | $w_{82}$ | $w_{83}$ | $w_{84}$ | $\cdots$ | $w_{8m}$ |
| $\vdots$ | $\vdots$ | $\vdots$ | $\vdots$ | $\vdots$ | $\vdots$ | $\vdots$ |
| $v_n$ | $w_{n1}$ | $w_{n2}$ | $w_{n3}$ | $w_{n4}$ | $\cdots$ | $w_{nm}$ |

FIG. 4

| | $c_1$ | $c_2$ | $c_3$ | $c_4$ | ... | $c_m$ |
|---|---|---|---|---|---|---|
| $v_1$ | $x_{11}w_{11}$ | $x_{12}w_{12}$ | $x_{13}w_{13}$ | $x_{14}w_{14}$ | ... | $x_{1m}w_{1m}$ |
| $v_2$ | $x_{21}w_{21}$ | $x_{22}w_{22}$ | $x_{23}w_{23}$ | $x_{24}w_{24}$ | ... | $x_{2m}w_{2m}$ |
| $v_3$ | $x_{31}w_{31}$ | $x_{32}w_{32}$ | $x_{33}w_{33}$ | $x_{34}w_{34}$ | ... | $x_{3m}w_{3m}$ |
| $v_4$ | $x_{41}w_{41}$ | $x_{42}w_{42}$ | $x_{43}w_{43}$ | $x_{44}w_{44}$ | ... | $x_{4m}w_{4m}$ |
| $v_5$ | $x_{51}w_{51}$ | $x_{52}w_{52}$ | $x_{53}w_{53}$ | $x_{54}w_{54}$ | ... | $x_{5m}w_{5m}$ |
| $v_6$ | $x_{61}w_{61}$ | $x_{62}w_{62}$ | $x_{63}w_{63}$ | $x_{64}w_{64}$ | ... | $x_{6m}w_{6m}$ |
| $v_7$ | $x_{71}w_{71}$ | $x_{72}w_{72}$ | $x_{73}w_{73}$ | $x_{74}w_{74}$ | ... | $x_{7m}w_{7m}$ |
| $v_8$ | $x_{81}w_{81}$ | $x_{82}w_{82}$ | $x_{83}w_{83}$ | $x_{84}w_{84}$ | ... | $x_{8m}w_{8m}$ |
| ... | ... | ... | ... | ... | ... | ... |
| $v_n$ | $x_{n1}w_{n1}$ | $x_{n2}w_{n2}$ | $x_{n3}w_{n3}$ | $x_{n4}w_{n4}$ | ... | $x_{nm}w_{nm}$ |

| | $c_1$ | $c_2$ | $c_3$ | $c_4$ | $c_5$ | $\cdots$ | $c_m$ |
|---|---|---|---|---|---|---|---|
| $c_1$ | $Var(c_1)$ | $Cov(c_1, c_2)$ | $Cov(c_1, c_3)$ | $Cov(c_1, c_4)$ | $Cov(c_1, c_5)$ | $\cdots$ | $Cov(c_1, c_m)$ |
| $c_2$ | $Cov(c_2, c_1)$ | $Var(c_2)$ | $Cov(c_2, c_3)$ | $Cov(c_2, c_4)$ | $Cov(c_2, c_5)$ | $\cdots$ | $Cov(c_2, c_m)$ |
| $c_3$ | $Cov(c_3, c_1)$ | $Cov(c_3, c_2)$ | $Var(c_3)$ | $Cov(c_3, c_4)$ | $Cov(c_3, c_5)$ | $\cdots$ | $Cov(c_3, c_m)$ |
| $c_4$ | $Cov(c_4, c_1)$ | $Cov(c_4, c_2)$ | $Cov(c_4, c_3)$ | $Var(c_4)$ | $Cov(c_4, c_5)$ | $\cdots$ | $Cov(c_4, c_m)$ |
| $c_5$ | $Cov(c_5, c_1)$ | $Cov(c_5, c_2)$ | $Cov(c_5, c_3)$ | $Cov(c_5, c_4)$ | $Var(c_5)$ | $\cdots$ | $Cov(c_5, c_m)$ |
| $\vdots$ | $\vdots$ | $\vdots$ | $\vdots$ | $\vdots$ | $\vdots$ | $\vdots$ | $\vdots$ |
| $c_m$ | $Cov(c_m, c_1)$ | $Cov(c_m, c_2)$ | $Cov(c_m, c_3)$ | $Cov(c_m, c_4)$ | $Cov(c_m, c_5)$ | $\cdots$ | $Var(c_m)$ |

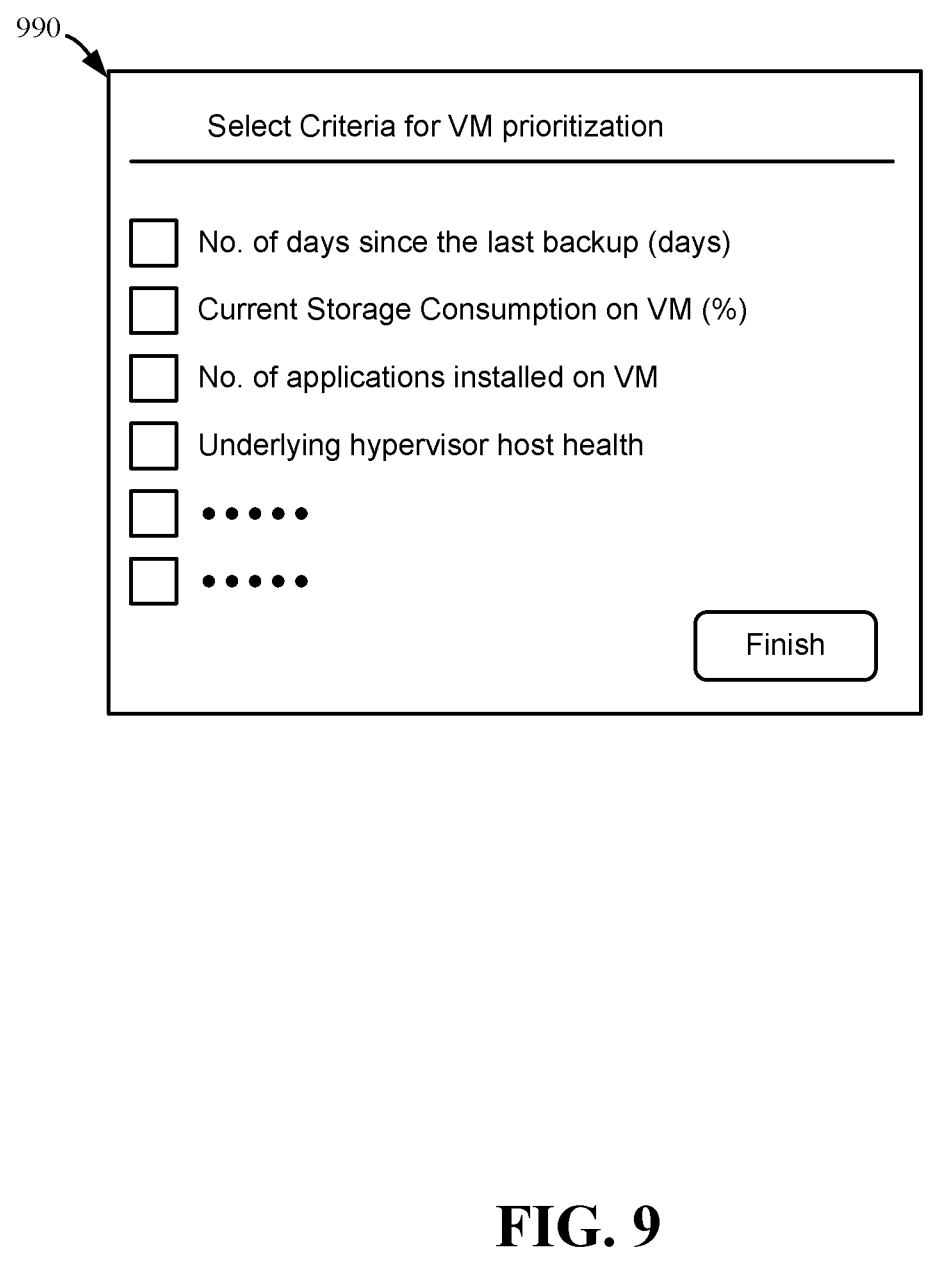

Select Criteria for VM prioritization

☐ No. of days since the last backup (days)

☐ Current Storage Consumption on VM (%)

☐ No. of applications installed on VM

☐ Underlying hypervisor host health

☐ • • • • •

☐ • • • • •

Finish

FIG. 9

| VM | C1: Days since last backup | C2: Current Storage Consumption | C3: Number of Apps installed | C4: Host Health | ... | Cn: Part of a VM cluster? |
|---|---|---|---|---|---|---|
| VM-1 | 3 | 75% | 1 | Green | ⋮ | No |
| VM2 | 0 | 62% | 8 | Green | ⋮ | No |
| VM-3 | 4 | 37% | 3 | Green | ⋮ | Yes |
| VM-4 | 1 | 31% | 0 | Red | ⋮ | No |
| VM-5 | 7 | 90% | 3 | Yellow | ⋮ | Yes |
| VM-6 | 3 | 48% | 2 | Yellow | ⋮ | No |
| VM-7 | 2 | 12% | 4 | Green | ⋮ | No |
| VM-8 | 1 | 14% | 1 | Yellow | ⋮ | No |
| VM-9 | 3 | 19% | 5 | Green | ⋮ | No |
| ⋮ | ⋮ | ⋮ | ⋮ | ⋮ | ⋮ | ⋮ |

| VM | C1: Days since last backup | C2: Current Storage Consumption | C3: Number of Apps installed | C4: Host Health | ... | Cn: Part of a VM cluster? |
|---|---|---|---|---|---|---|
| VM-1 | 3 | 75% | 1 | 4 | ... | 0 |
| VM2 | 0 | 62% | 8 | 4 | ... | 0 |
| VM-3 | 4 | 37% | 3 | 4 | ... | 1 |
| VM-4 | 1 | 31% | 0 | 1 | ... | 0 |
| VM-5 | 7 | 90% | 3 | 2 | ... | 1 |
| VM-6 | 3 | 48% | 2 | 2 | ... | 0 |
| VM-7 | 2 | 12% | 4 | 4 | ... | 0 |
| VM-8 | 1 | 14% | 1 | 2 | ... | 0 |
| VM-9 | 3 | 19% | 5 | 4 | ... | 0 |
| ... | ... | ... | ... | ... | ... | ... |

| VM | C1: Days since last backup | C2: Current Storage Consumption | C3: Number of Apps installed | C4: Host Health | ... | Cn: Part of a VM cluster? |
|---|---|---|---|---|---|---|
| VM-1 | 0.14285 | 0.75000 | 0.07692 | 0.99999 | ... | 0.00001 |
| VM-2 | 0.00023 | 0.62000 | 0.61538 | 0.99999 | ... | 0.00001 |
| VM-3 | 0.19047 | 0.32000 | 0.23076 | 0.99999 | ... | 0.99999 |
| VM-4 | 0.04761 | 0.31000 | 0.00001 | 0.24999 | ... | 0.00001 |
| VM-5 | 0.33334 | 0.90000 | 0.23076 | 0.49999 | ... | 0.99999 |
| VM-6 | 0.14284 | 0.48000 | 0.15384 | 0.49999 | ... | 0.00001 |
| VM-7 | 0.09523 | 0.12000 | 0.30769 | 0.99999 | ... | 0.00001 |
| VM-8 | 0.19047 | 0.14000 | 0.07692 | 0.49999 | ... | 0.00001 |
| VM-9 | 0.33334 | 0.19000 | 0.38461 | 0.99999 | ... | 0.00001 |
| ... | ... | ... | ... | ... | ... | ... |

| VM | Relative Closeness $C^*$ |
|----|----|
| VM-1 | 0.63 |
| VM2 | 0.81 |
| VM-3 | 0.77 |
| VM-4 | 0.79 |
| VM-5 | 0.50 |
| VM-6 | 0.89 |
| VM-7 | 0.45 |
| VM-8 | 0.27 |
| VM-9 | 0.38 |
| ... | ... |

| VM | Relative Closeness $C^*$ | Rank |
|---|---|---|
| VM-6 | 0.86 | 1 |
| VM2 | 0.81 | 2 |
| VM-4 | 0.79 | 3 |
| VM-3 | 0.77 | 4 |
| VM-1 | 0.63 | 5 |
| VM-5 | 0.50 | 6 |
| VM-7 | 0.45 | 7 |
| VM-9 | 0.38 | 8 |
| VM-8 | 0.27 | 9 |
| ... | ... | |

FIG. 14

| | MIPS (Speed) | Cost (per hour) | ... | Parameter - *N* |
|---|---|---|---|---|
| VM0 | 550 | $0.520 | • • • | xxx |
| VM1 | 600 | $0.709 | • • • | xxx |
| VM2 | 725 | $0.100 | • • • | xxx |
| VM3 | 850 | $0.165 | • • • | xxx |

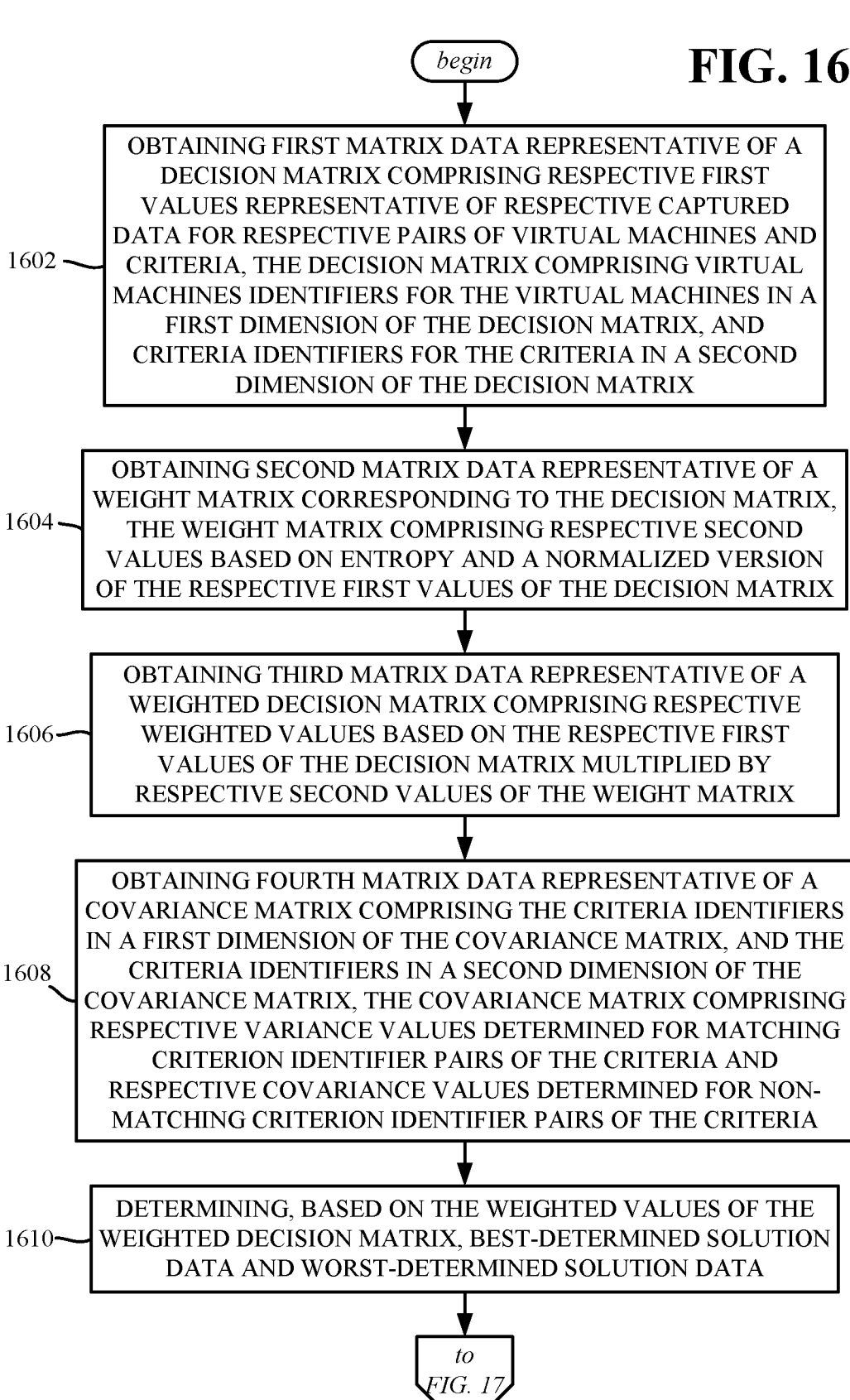

begin

FIG. 16

1602 — OBTAINING FIRST MATRIX DATA REPRESENTATIVE OF A DECISION MATRIX COMPRISING RESPECTIVE FIRST VALUES REPRESENTATIVE OF RESPECTIVE CAPTURED DATA FOR RESPECTIVE PAIRS OF VIRTUAL MACHINES AND CRITERIA, THE DECISION MATRIX COMPRISING VIRTUAL MACHINES IDENTIFIERS FOR THE VIRTUAL MACHINES IN A FIRST DIMENSION OF THE DECISION MATRIX, AND CRITERIA IDENTIFIERS FOR THE CRITERIA IN A SECOND DIMENSION OF THE DECISION MATRIX

1604 — OBTAINING SECOND MATRIX DATA REPRESENTATIVE OF A WEIGHT MATRIX CORRESPONDING TO THE DECISION MATRIX, THE WEIGHT MATRIX COMPRISING RESPECTIVE SECOND VALUES BASED ON ENTROPY AND A NORMALIZED VERSION OF THE RESPECTIVE FIRST VALUES OF THE DECISION MATRIX

1606 — OBTAINING THIRD MATRIX DATA REPRESENTATIVE OF A WEIGHTED DECISION MATRIX COMPRISING RESPECTIVE WEIGHTED VALUES BASED ON THE RESPECTIVE FIRST VALUES OF THE DECISION MATRIX MULTIPLIED BY RESPECTIVE SECOND VALUES OF THE WEIGHT MATRIX

1608 — OBTAINING FOURTH MATRIX DATA REPRESENTATIVE OF A COVARIANCE MATRIX COMPRISING THE CRITERIA IDENTIFIERS IN A FIRST DIMENSION OF THE COVARIANCE MATRIX, AND THE CRITERIA IDENTIFIERS IN A SECOND DIMENSION OF THE COVARIANCE MATRIX, THE COVARIANCE MATRIX COMPRISING RESPECTIVE VARIANCE VALUES DETERMINED FOR MATCHING CRITERION IDENTIFIER PAIRS OF THE CRITERIA AND RESPECTIVE COVARIANCE VALUES DETERMINED FOR NON-MATCHING CRITERION IDENTIFIER PAIRS OF THE CRITERIA

1610 — DETERMINING, BASED ON THE WEIGHTED VALUES OF THE WEIGHTED DECISION MATRIX, BEST-DETERMINED SOLUTION DATA AND WORST-DETERMINED SOLUTION DATA to
FIG. 17

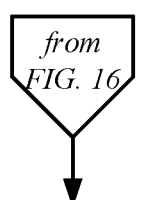

*from FIG. 16*

1702 — OBTAINING RESPECTIVE POSITIVE SEPARATION VALUES AND RESPECTIVE NEGATIVE SEPARATION VALUES FOR RESPECTIVE ALTERNATIVES CORRESPONDING TO THE RESPECTIVE VIRTUAL MACHINES, THE OBTAINING OF THE RESPECTIVE POSITIVE SEPARATION VALUES AND THE RESPECTIVE NEGATIVE SEPARATION VALUES COMPRISING PERFORMING MAHALANOBIS DISTANCE DETERMINATIONS BASED ON RESPECTIVE FIRST DIFFERENCES BETWEEN THE RESPECTIVE WEIGHTED VALUES OF THE RESPECTIVE ALTERNATIVES AND THE BEST-DETERMINED SOLUTION DATA, RESPECTIVE SECOND DIFFERENCES BETWEEN THE RESPECTIVE WEIGHTED VALUES OF THE RESPECTIVE ALTERNATIVES TO THE WORST-DETERMINED SOLUTION DATA, A DIAGONAL WEIGHT MATRIX OBTAINED FROM THE WEIGHT MATRIX, A TRANSPOSE OF THE DIAGONAL WEIGHT MATRIX, AND AN INVERSE OF THE COVARIANCE MATRIX

1704 — DETERMINING RESPECTIVE RELATIVE CLOSENESS VALUES FOR THE RESPECTIVE ALTERNATIVES BASED ON THE RESPECTIVE POSITIVE SEPARATION VALUES AND RESPECTIVE NEGATIVE SEPARATION VALUES

1706 — TAKING ACTION TO PERFORM RESPECTIVE TASKS RELATED TO THE RESPECTIVE VIRTUAL MACHINES, THE TAKING ACTION PERFORMED IN AN ORDER THAT IS BASED ON THE RESPECTIVE RELATIVE CLOSENESS VALUES

*end*

FIG. 17

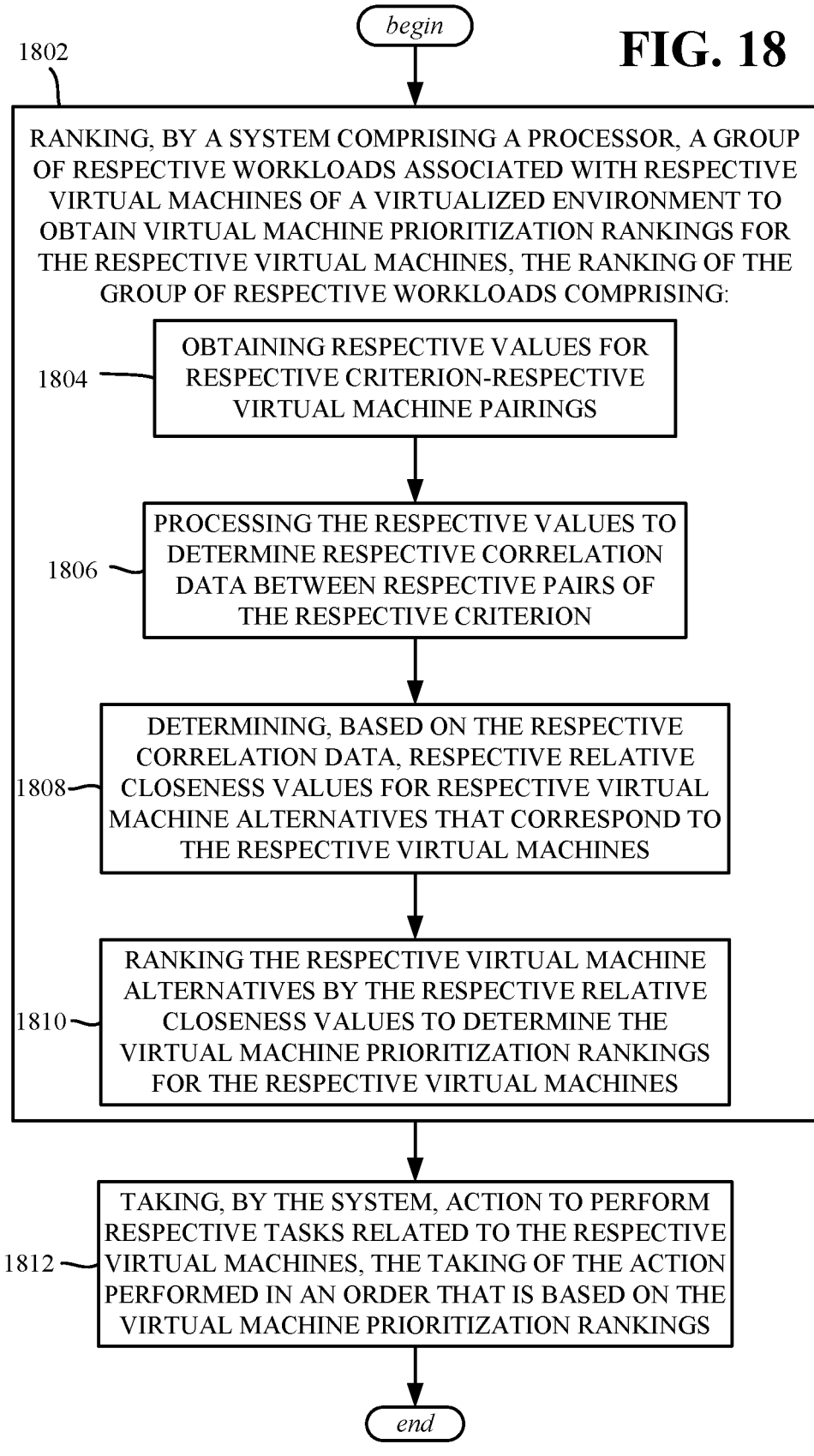

1802 RANKING, BY A SYSTEM COMPRISING A PROCESSOR, A GROUP OF RESPECTIVE WORKLOADS ASSOCIATED WITH RESPECTIVE VIRTUAL MACHINES OF A VIRTUALIZED ENVIRONMENT TO OBTAIN VIRTUAL MACHINE PRIORITIZATION RANKINGS FOR THE RESPECTIVE VIRTUAL MACHINES, THE RANKING OF THE GROUP OF RESPECTIVE WORKLOADS COMPRISING:

1804 OBTAINING RESPECTIVE VALUES FOR RESPECTIVE CRITERION-RESPECTIVE VIRTUAL MACHINE PAIRINGS

1806 PROCESSING THE RESPECTIVE VALUES TO DETERMINE RESPECTIVE CORRELATION DATA BETWEEN RESPECTIVE PAIRS OF THE RESPECTIVE CRITERION

1808 DETERMINING, BASED ON THE RESPECTIVE CORRELATION DATA, RESPECTIVE RELATIVE CLOSENESS VALUES FOR RESPECTIVE VIRTUAL MACHINE ALTERNATIVES THAT CORRESPOND TO THE RESPECTIVE VIRTUAL MACHINES

1810 RANKING THE RESPECTIVE VIRTUAL MACHINE ALTERNATIVES BY THE RESPECTIVE RELATIVE CLOSENESS VALUES TO DETERMINE THE VIRTUAL MACHINE PRIORITIZATION RANKINGS FOR THE RESPECTIVE VIRTUAL MACHINES

1812 TAKING, BY THE SYSTEM, ACTION TO PERFORM RESPECTIVE TASKS RELATED TO THE RESPECTIVE VIRTUAL MACHINES, THE TAKING OF THE ACTION PERFORMED IN AN ORDER THAT IS BASED ON THE VIRTUAL MACHINE PRIORITIZATION RANKINGS

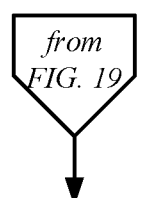

from
FIG. 19

2002 — OBTAINING RESPECTIVE POSITIVE SEPARATION VALUES AND RESPECTIVE NEGATIVE SEPARATION VALUES FOR RESPECTIVE ALTERNATIVES CORRESPONDING TO RESPECTIVE VIRTUAL MACHINES IDENTIFIED IN THE WEIGHTED DECISION MATRIX, THE OBTAINING OF THE RESPECTIVE POSITIVE SEPARATION VALUES AND THE RESPECTIVE NEGATIVE SEPARATION VALUES COMPRISING PERFORMING MAHALANOBIS DISTANCE DETERMINATIONS BASED ON RESPECTIVE FIRST DIFFERENCES BETWEEN THE RESPECTIVE WEIGHTED VALUES OF THE RESPECTIVE ALTERNATIVES AND THE BEST-DETERMINED SOLUTION DATA, RESPECTIVE SECOND DIFFERENCES BETWEEN THE RESPECTIVE WEIGHTED VALUES OF THE RESPECTIVE ALTERNATIVES TO THE WORST-DETERMINED SOLUTION DATA, A DIAGONAL WEIGHT MATRIX OBTAINED FROM THE WEIGHT MATRIX, A TRANSPOSE OF THE DIAGONAL WEIGHT MATRIX, AND AN INVERSE OF THE COVARIANCE MATRIX

2004 — DETERMINING RESPECTIVE RELATIVE CLOSENESS VALUES FOR THE RESPECTIVE ALTERNATIVES BASED ON THE RESPECTIVE POSITIVE SEPARATION VALUES AND RESPECTIVE NEGATIVE SEPARATION VALUES

2006 — TAKING ACTION TO PERFORM RESPECTIVE TASKS RELATED TO THE RESPECTIVE VIRTUAL MACHINES, THE TAKING ACTION PERFORMED IN AN ORDER THAT IS BASED ON THE RESPECTIVE RELATIVE CLOSENESS VALUES end

FIG. 20

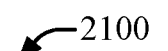
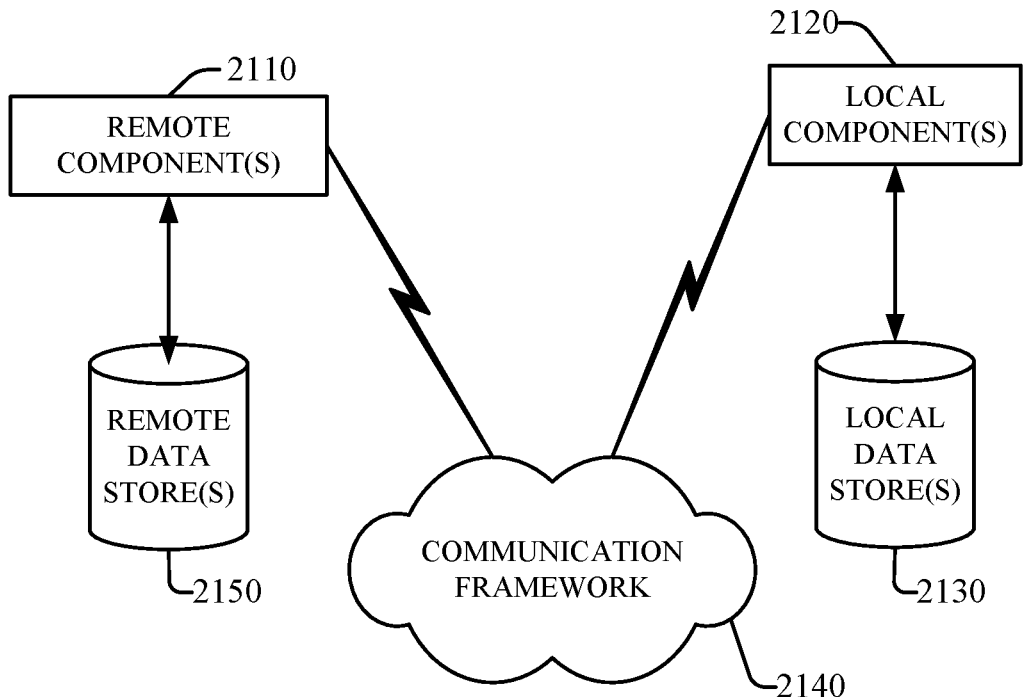
FIG. 21

WORKLOAD PRIORITIZATION IN A CLOUD ENVIRONMENT

BACKGROUND

In a virtualized environment, there can exist thousands of virtual machines that are deployed to serve various business purposes. During certain conditions such as critical power (uninterruptible power supply/source, or UPS) events, task scheduling, backup operations, and so forth, more essential workloads should be handled in some intelligent, prioritized manner, rather than arbitrarily.

Existing workload prioritization approaches are mostly manual, trivial and have several drawbacks. As one example in a virtualized environment, workloads can be prioritized for a graceful shutdown during UPS events; however, the end user needs to manually select different categories for the workload-associated virtual machines, such as "High," "Medium," and "Low" categories. Manually choosing among categories is often just a guess, rather than based on any workload-relevant criteria. Moreover, once the number of virtual machines/workloads in a deployment gets to some (typical) level that is not that large, the process of manually virtual machines/workloads them becomes tedious and unscalable.

As another example, consider workload prioritization during backup operations in which, when a backup operation is triggered based on some scheduling policy, the backup server processes the virtual machines arbitrarily. Some backup server vendors provide options such as selecting the workloads in a lexicographical order for backups. This is inadequate, as to provide meaningful data protection backup operations more important virtual machines should be protected first.

BRIEF DESCRIPTION OF THE DRAWINGS

The technology described herein is illustrated by way of example and not limited in the accompanying figures in which like reference numerals indicate similar elements and in which:

FIG. 3 is a representation of an example decision matrix comprising rows of virtual machines and columns of criteria for use by the process of FIG. 2, in accordance with various aspects and implementations of the subject disclosure.

FIG. 4 is a representation of an example weight matrix containing weight values corresponding to the decision matrix of FIG. 3, in accordance with various aspects and implementations of the subject disclosure.

FIG. 5 is a representation of an example weighted decision matrix containing values corresponding to the weight matrix of FIG. 4 multiplied by the decision matrix of FIG. 3, in accordance with various aspects and implementations of the subject disclosure.

FIG. 6 is a representation of an example covariance matrix comprising criteria pairs with variance or covariance values for use by the process of FIG. 2, in accordance with various aspects and implementations of the subject disclosure.

FIG. 9 is a representation of an example user interface by which an end user can select criteria for use in workload prioritization via the process of FIG. 2, and sorted by the relative closeness values, in accordance with various aspects and implementations of the subject disclosure.

FIG. 10 is a representation of an example decision matrix comprising rows of virtual machines and columns of backup-related criteria, in accordance with various aspects and implementations of the subject disclosure.

FIG. 11 is a representation of an example decision matrix in which certain data in FIG. 10 has been converted to numeric values, in accordance with various aspects and implementations of the subject disclosure.

FIG. 12 is a representation of an example decision matrix in which the values of FIG. 11 have been normalized, in accordance with various aspects and implementations of the subject disclosure.

FIG. 13 is a representation of example relative closeness value determined for virtual machines, e.g., based on the normalized values of FIG. 11 as processed by the prioritization process of FIG. 2, in accordance with various aspects and implementations of the subject disclosure.

FIG. 14 is a representation of example respective virtual machine identifiers of FIG. 13 after having been sorted by third respective associated relative closeness values, in accordance with various aspects and implementations of the subject disclosure.

FIG. 15 is a representation of example criteria for virtual machine prioritization with respect to task scheduling, in accordance with various aspects and implementations of the subject disclosure.

FIGS. 16 and 17 comprise a flow diagram showing example operations related to workflow/virtual machine prioritization based on the example matrices and Mahalanobis distance, in accordance with various aspects and implementations of the subject disclosure.

FIG. 18 is a flow diagram showing example operations related to ranking a group of respective workloads associated with respective virtual machines by relative closeness ratings, in accordance with various aspects and implementations of the subject disclosure.

FIGS. 19 and 20 comprise a flow diagram showing example operations related to related to workflow/virtual machine prioritization and taking action based on respective relative closeness values, in accordance with various aspects and implementations of the subject disclosure.

FIG. 21 is a block diagram representing an example computing environment into which aspects of the subject matter described herein may be incorporated.

DETAILED DESCRIPTION

Various aspects of the technology described herein are generally directed towards addressing workload prioritization as a confidence ranking multiple-criteria decision analysis based on multiple attributes. To this end, the technology described herein uses a Mahalanobis distance-based variance-covariance matrix to add correlation directionality in the decision-making process/engine. The decision space has finite alternatives.

With respect to workloads, there is a strong correlation between prioritization attributes. One non-limiting example includes a correlation between the type of application installed (e.g., a relational database management system) and storage consumption of a virtual machine on which the application executes. Another non-limiting example includes a correlation between cluster membership and hypervisor health preference data; for example the underlying system hosting a virtual machine is in bad health, then that virtual machine can be prioritized for a data protection job. Cluster membership between virtual machines also is a strong correlation. Using a Mahalanobis distance-based variance-covariance matrix adds correlation directionality in the prioritization of workloads/virtual machines decision, resulting in a more optimal solution (e.g., relative to existing solutions such as TOPSIS).

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1A:
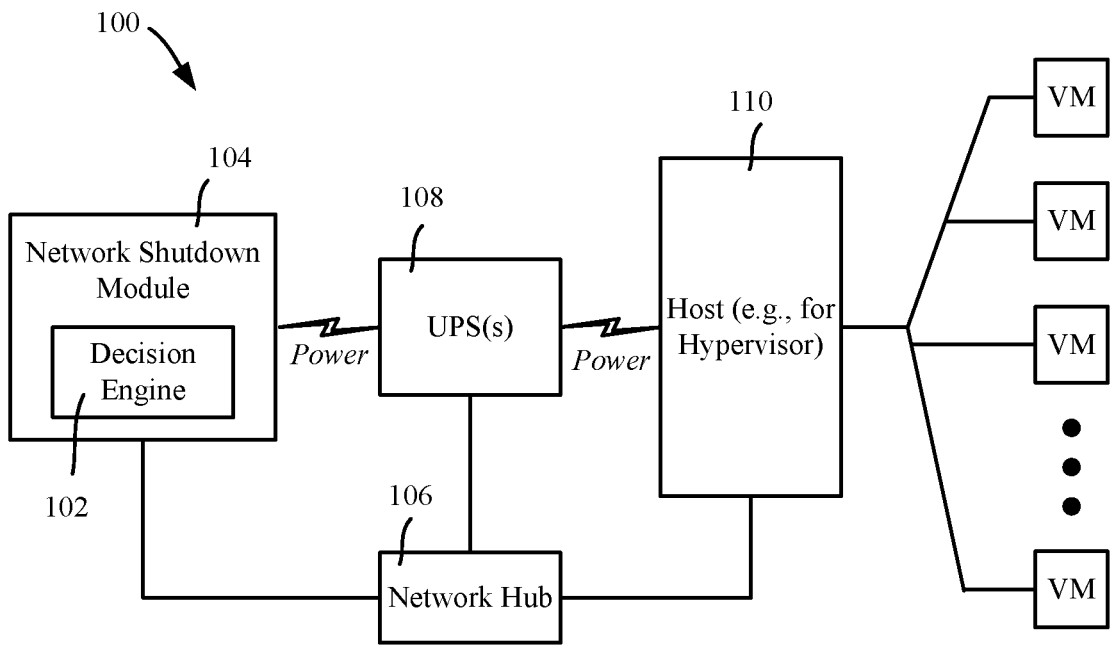
FIG. 1A is a representation of an example system/architecture including a workflow prioritization decision engine in a network shutdown module to provide a prioritized virtual machine shutdown order, in accordance with various aspects and implementations of the subject disclosure.

FIG. 1A is an example representation of a system/architecture 100 representing an uninterruptible power supply/source (UPS) management application in which a decision engine 102 as described herein is incorporated into (or alternatively coupled to) a network shutdown module 104 that is coupled by a network hub 106 to control a UPS 108 (or multiple UPSs). The UPS 108 provides power to a virtualized infrastructure, which in this example includes a host 110 for a hypervisor that runs virtual machines (VMs). As will be understood, the decision engine 102 intelligently prioritize the workloads and makes decisions to gracefully shutdown the virtual machines in the event of a power failure. In general, an end user can select various criteria from a user interface that determines a VM prioritization order to be performed by the decision engine 102. Once the order is known, a network shutdown module 104 can perform various operations (like the shutdown of VMs, migration of VMs, and/or the like) in a more efficient and intelligently prioritized manner during critical UPS events.

Figure 1B:
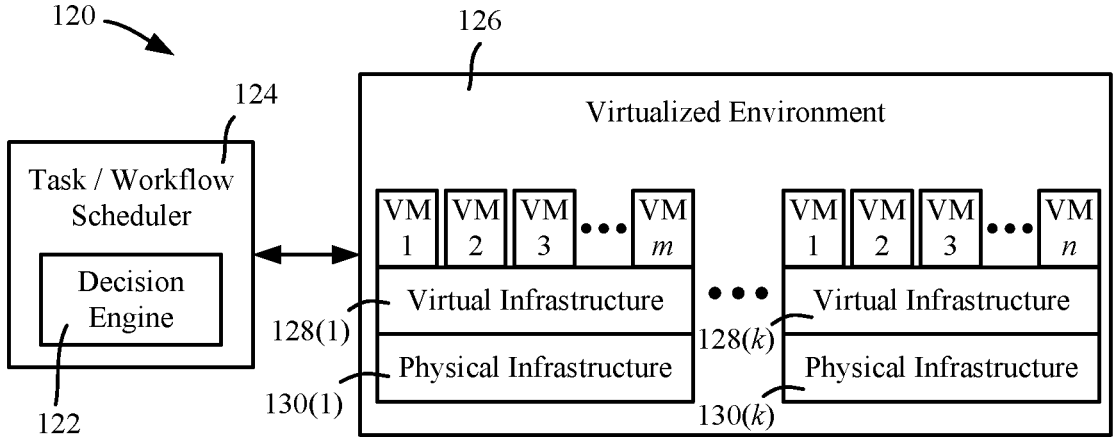
FIG. 1B is a representation of an example system/architecture including a prioritization decision engine in a task/ workflow scheduler, in accordance with various aspects and implementations of the subject disclosure.

FIG. 1B is an example representation of a system/architecture 120 representing a decision engine 122 embedded inside (or alternatively coupled to) a task/workflow scheduler 124. The workflow scheduler 124 orchestrates and manages a virtualized environment 126 that includes virtual infrastructure 128(1)-128(q) based on physical infrastructure 130(1)-130(q). Some number of virtual machines VM1-VMm are depicted as running via the virtual infrastructure 128(1), and similarly virtual machines VM1-VMn are depicted as running via the virtual infrastructure 130(1). As described herein, via the decision engine 122 the task/workflow scheduler can assign tasks to virtual machines based on a priority ranking of the tasks/workflows.

In the above examples, in a private/hybrid cloud environment a decision engine can be in the control plane of a use-case infrastructure. As will be understood, the decision engine can be considered a policy engine that allows a user to define the criteria upon which to prioritize operations. Such a policy engine can be utilized for many uses, including the non-limiting use case examples described herein. The decision engine includes Mahalanobis distance processing and related matrices by which prioritization decisions are made. One significant benefit of using a Mahalanobis-distance based ranking engine is the pairwise correlation between the selection criteria attributes to produce a more optimal ranking.

Indeed, computing probability distribution using Mahalanobis distance does not assume that the sample points are distributed in an N-dimensional ($\mathbb{R}^n$) spherical space about the centroid, (in contrast to using standard-deviation to calculate the probability distribution of sample points in an N-dimensional ($\mathbb{R}^n$) Euclidean Space from the centroid, which is assumed to be spherical). Further, considering the pair-wise correlation between criteria (attributes) in a dataset, a covariance matrix is constructed that captures correlational directionality for the data set. This facilitates accurate probability distribution, whether spherical or ellipsoidal, that better represents the dataset, in contrast to determining distance between a point to a centroid without considering the direction of this point; as such, Euclidean distance does not consider the correlation between various criteria in the dataset to calculate the likelihood of the test point being in the distribution. By considering the directionality in the dataset, corresponding to the correlation between criteria, the probability of a test point being in a set is better estimated, which significantly improves the accuracy and precision of the prediction.

Figure 2:
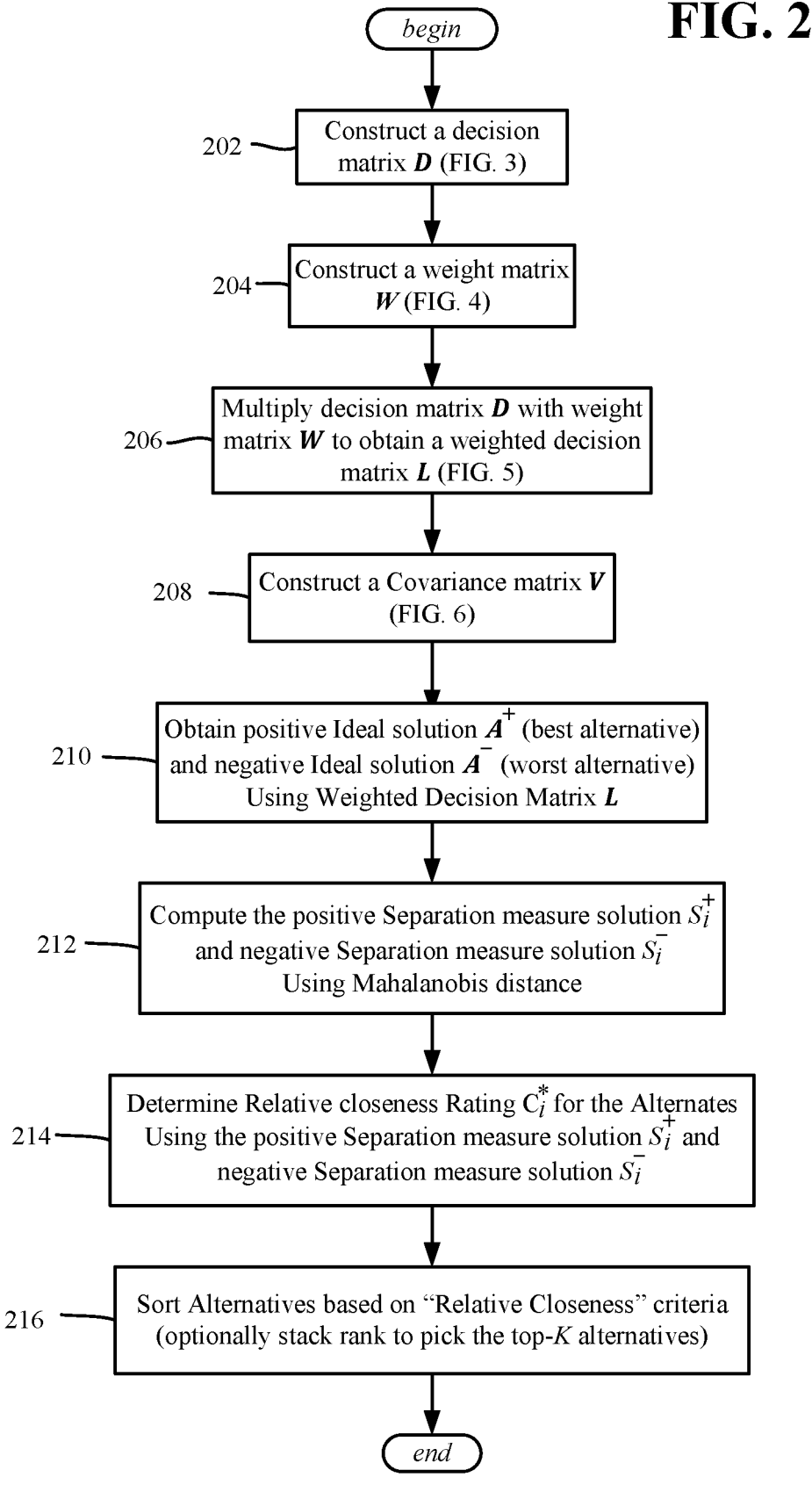
FIG. 2 is a flow diagram showing example operations related to a confidence ranking multi-criteria decision analysis process for workflow/virtual machine prioritization, in accordance with various aspects and implementations of the subject disclosure.

FIG. 2 shows operations of a multiple-step process that is further described by diagrams and tables of FIGS. 3-7. Operation 202 represents constructing a decision matrix D of size $\mathbb{R}^{n \times m}$ with a first dimension being virtual machine identifiers, and a second dimension being criteria (e.g., non-duplicated, or unique to the matrix). As shown in the example of FIG. 3, the decision matrix D 330 has rows for n input VMs ($v_1 \ldots v_n$) and columns for m criteria ($c_1 \ldots c_m$). The data can be captured from existing state information, e.g., column $c_3$ may have as its criteria as "number of apps installed," and for virtual machine $v_2$, the value is captured (obtained/determined to be) as eight (8) applications currently installed. The values in the decision matrix D 330 for workloads/virtual machine-criteria pairings are shown as transformed into variables, e.g., $x_{11}$-$x_{nm}$ in this example.

Operation 204 represents construct a weight matrix W of size $\mathbb{R}^{n \times m}$ similar to that of the decision matrix 330 using the Entropy method:

$$W_j = \frac{1 - ej}{\sum_{j \in n} 1 - ej}$$

where entropy is defined as:

$$e_j = -h \sum_{i \in n} \left( r_{ij} / \log_e(r_{ij}) \right)$$

$$h = 1/\log_e(r_{ij})$$

$$(r_{ij}) = \text{normalized decision matrix.}$$

FIG. 4 shows an example of a weight matrix W 440 with the same dimensions as the decision matrix D 330 of FIG. 3. As can be seen from above, the weight values are determined by entropy based on a normalized version (not explicitly shown) of the decision matrix D 330.

Operation 206 represents multiplying the decision matrix D by the weight matrix W to obtain a weighted decision matrix L of size $\mathbb{R}^{n \times m}$ similar to that of decision matrix using the Entropy method:

$$L = D \times W$$

FIG. 5 shows the weighted decision matrix L 550.

Operation 208 represents constructing a covariance matrix V of size $\mathbb{R}^{m \times m}$, where the element of the matrix represent pair-wise correlation between each pair of two criterion. For example, in covariance matrix V 660 of FIG. 6, correlation between $c_1$ and $c_2$ is represented as:

$$Cov(c_1, c_2)$$

Diagonal elements represent variance for the given criteria.

$$Var(c_1)$$

Determination of the variance and covariance values is well-known and not described herein for purposes of brevity.

Operation 210 represents, using the weighted decision matrix L 550, obtaining of a positive ideal solution $A^+$ (best alternative) and negative ideal solution $A^-$ (worst alternative). The values of the weighted decision matrix L 550 are processed to determine these data.

Operation 212 represents determining, using Mahalanobis distance, the positive separation measure solution $$S_i^+$$

and negative separation measure solution $$S_i^-$$

for the alternatives (corresponding to virtual machines) $A_i$ where i=1, 2, . . . n:

$$S_i^+ = \sqrt{(A_i - A^+) \cdot W^T \cdot V^{-1} \cdot W \cdot (A_i - A^+)}$$

$$S_i^+ = \sqrt{(A_i - A^-) \cdot W^T \cdot V^{-1} \cdot W \cdot (A_i - A^-)}$$

where:
$A_i$: All possible alternatives, where i=1, 2, . . . n
W: Diagonal Weight Matrix
$W^T$: Transpose of Diagonal Weight Matrix
$V^{-1}$: Inverse of Covariance Matrix Operation 214 represents determining for every alternate, the relative closeness $$C_i^*$$

to the ideal solution, using the positive separation measure solutions $$S_i^+$$

and negative separation measure solutions $$S_i^-,$$

$$C_i^* = \frac{S_i^-}{S_i^- + S_i^+}$$

Figure 7:
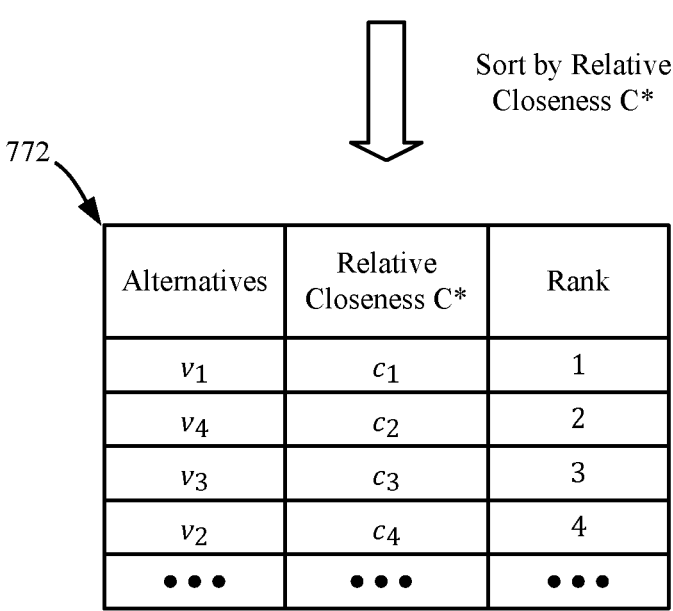
FIG. 7 is a representation of example data structures including alternatives (virtual machines) with relative closeness values determined the process of FIG. 2, and sorted by the relative closeness values, in accordance with various aspects and implementations of the subject disclosure.

The relative closeness rating $$C_i^*$$

is a real valued number between 0 and 1

$$(C_i^* \in \{0, 1\})$$

with 1 as the best alternative and 0 as the worst alternative. FIG. 7 shows an example of a data structure 770 that associates the alternatives (virtual machine identifiers $v_1$-$v_4$) to the closeness values $c_1$-$c_4$.

Operation 216 represents sorting the alternatives obtained via operation 214 based on "relative closeness" criteria. FIG. 7 also shows an example of a data structure 772 that sorts the relative closeness values $c_1$-$c_4$ and thereby rearranges the order of alternatives $v_1$-$v_4$ so as to be ranked 1-4. If appropriate (e.g., only a subset is desired, stack ranking can be used to select the best top-K alternatives for further processing. An example of stack ranking to obtain a top-K subset of alternatives is described with reference to FIG. 8.

Figure 8:
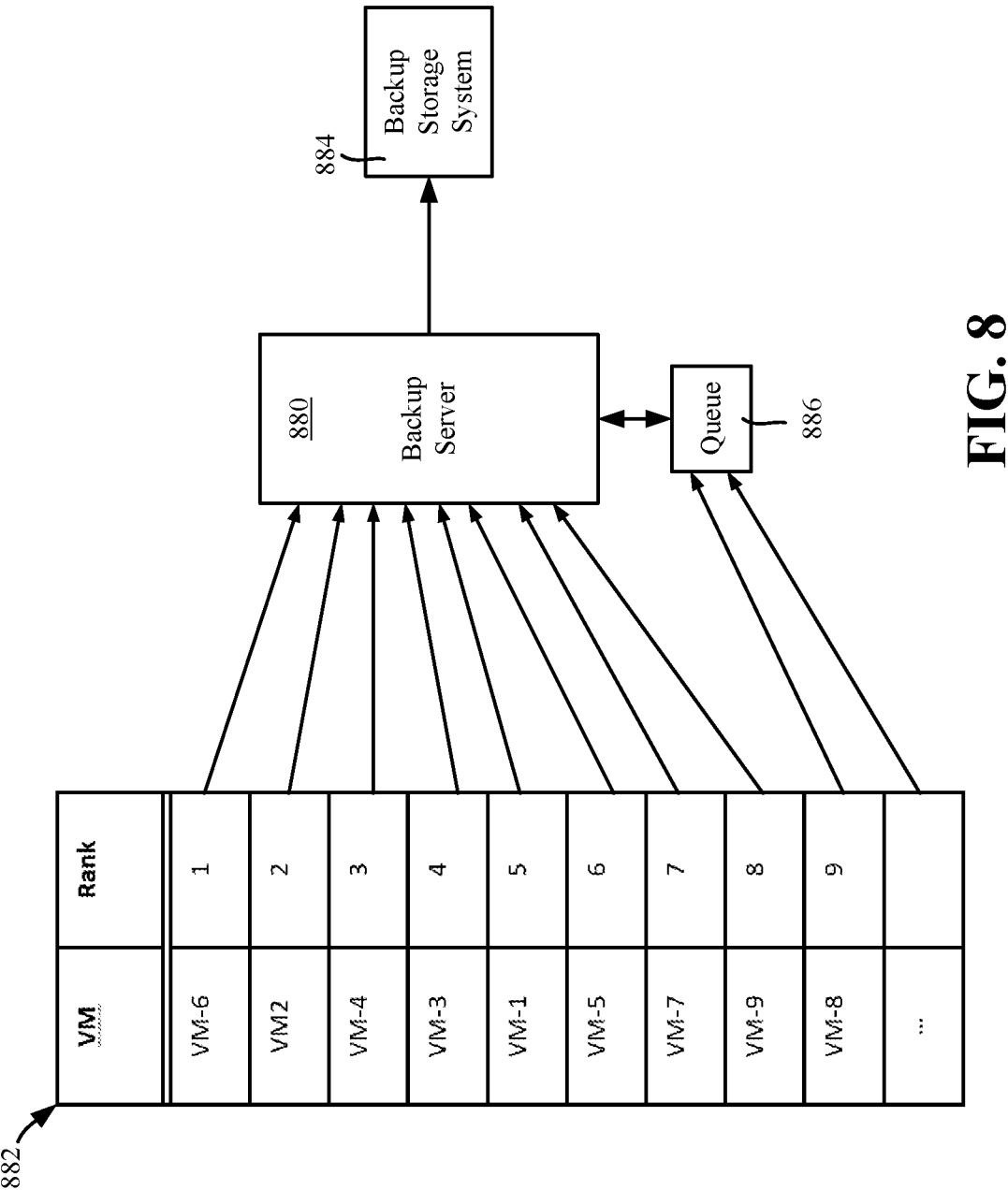
FIG. 8 is an example block diagram of backup operations based on virtual machine prioritization in which only a top-ranked subset of the virtual machines can be backed up in parallel (with other virtual machines queued for backup), in accordance with various aspects and implementations of the subject disclosure.

Turning to a use-case example, consider virtual machine prioritization during backup operations. As described herein, as part of a backup operation, workload prioritization can be achieved by embedding the decision engine (e.g., as described with reference to FIGS. 1A and 1B) into a proxy server supplied by a backup server 880 (FIG. 8). In the example of FIG. 8, based on a final virtual machine ranking data structure (e.g., ordered VM list) 882, virtual machines are selected in order by backup server(s) for backup operations to a backup storage system 884. In this example, consider that for a single deployed proxy server, only eight VM backup operations can run in parallel, with the rest queued in a queue (logically represented by block 886). Thus, only the top-ranked eight VMs are picked for backup, and the remaining VMs will be in a queued state until the top-ranked VMs are backed up.

In a backup ecosystem, criteria that define virtual machine prioritization can be identified by customer/account teams, for example. Non-limiting examples include number of days since the last backup operation of the VM; if the of days since the last backup operation performed for this VM is greater than for other VMs, then this VM can be prioritized for backup operation, e.g., as it is important to protect this VM on priority.

Another example is current storage consumption on a VM. Storage consumption on VM is a significant criterion with respect to prioritizing VMs. For example, if one VM is ninety percent full (having relatively the most consumed storage when compared to other VMs), then this VM can be prioritized for data protection, as the customer can free up space proactively to avoid storage from getting too full on the client.

Another example is the number (and/or type) of applications installed on a VM. If there are applications such as database management systems installed on a VM, then this particular VM can be prioritized for data protection job to protect mission-critical/business-critical data first. Applications installed on the VM can be easily identified using third-party tools or via simple script embedded into the engine.

Yet another example is the health of an underlying system that hosts (e.g., runs the hypervisor) a VM. If the underlying system/device hosting a VM is in bad health, then this VM can be prioritized for a data protection job. Various factors can affect health such as CPU usage, RAM usage, disk health, datastore usage, and the like. The health of underlying system can be easily found by interacting with native monitoring tools provided by the virtualization software vendor. There are several health checks performed by the monitoring tools that can be used to determine the health, whereby the number of health checks passed can be taken as a unit of measurement.

Another example is whether or not a VM is part of a VM cluster. As set forth herein, there can be a strong correlations between VMs in a cluster.

FIG. 9 shows an example interface 990 for obtaining user-defined criteria selection, which in this example is directed to VM backup prioritization. The entered criteria can be obtained from an end user via such an interface, which may be part of a criteria selection wizard or the like. Depending on the customer requirements/goals, an end user can select only those criteria which are of interest. Based on the selected criteria, the decision-engine can now perform VM prioritization tasks.

FIG. 10 shows a backup VM prioritization criteria table example corresponding to the above criteria having each been selected using the criteria selection input. As described herein, a VM prioritization criteria matrix 1000 (table) with rows as VMs (also known as alternatives) and columns as criteria is created. In this example, actual values are captured for the VM-criterion pairs.

Continuing with this example, the criteria table data can be transformed transform, that is, categorical (nominal, ordinal) criteria can be converted into numeric features using label encoders and/or one-hot vector encoders. A modified matrix 1100 is shown in FIG. 11, corresponding to the decision matrix 1000. Normalization of this matrix 110 can be performed, in which data for the criteria is normalized using techniques such as unity-base, linear, vector, and so forth. A normalized version is shown as matrix 1200 of FIG. 12.

Continuing further with this example, as described herein, FIG. 13 shows a data structure 1300 that associates virtual machines with their relative closeness values. FIG. 14 shows a final ranking data structure 1400 obtained by sorting the VMs in descending order of their associated relative closeness values and assigning a rank.

As described with reference to FIG. 1B, a VM prioritization decision-making engine can be embedded into a task/workflow scheduler to perform prioritized VM tasks. The end user can select various criteria from a user interface (e.g., a "criteria selection wizard"), which is used to determine the prioritization rankings. Once ranked, the task/workflow scheduler can assign tasks to VMs based on the ranking. Example criteria 1500 is shown in FIG. 15, including MIPS (Million instructions per second/speed), cost, and the like. Based on these criteria, the technology described herein calculates respective relative closeness values of the respective alternatives and performs the final ranking of VMs.

One or more aspects can be embodied in a system, such as represented in the example operations of FIGS. 16 and 17, and for example can include a memory that stores computer executable components and/or operations, and a processor that executes computer executable components and/or operations stored in the memory. Example operations can include operation 1602 of FIG. 16, which represents obtaining first matrix data representative of a decision matrix comprising respective first values representative of respective captured data for respective pairs of virtual machines and criteria, the decision matrix comprising virtual machines identifiers for the virtual machines in a first dimension of the decision matrix, and criteria identifiers for the criteria in a second dimension of the decision matrix. Example operation 1604 represents obtaining second matrix data representative of a weight matrix corresponding to the decision matrix, the weight matrix comprising respective second values based on entropy and a normalized version of the respective first values of the decision matrix. Example operation 1606 represents obtaining third matrix data representative of a weighted decision matrix comprising respective weighted values based on the respective first values of the decision matrix multiplied by respective second values of the weight matrix. Example operation 1608 represents obtaining fourth matrix data representative of a covariance matrix comprising the criteria identifiers in a first dimension of the covariance matrix, and the criteria identifiers in a second dimension of the covariance matrix, the covariance matrix comprising respective variance values determined for matching criterion identifier pairs of the criteria and respective covariance values determined for non-matching criterion identifier pairs of the criteria. Example operation 1610 represents determining, based on the weighted values of the weighted decision matrix, best-determined solution data and worst-determined solution data. The operations continue at FIG. 17, where example operation 1702 of FIG. 17 represents obtaining respective positive separation values and respective negative separation values for respective alternatives corresponding to the respective virtual machines, the obtaining of the respective positive separation values and the respective negative separation values comprising performing Mahalanobis distance determinations based on respective first differences between the respective weighted values of the respective alternatives and the best-determined solution data, respective second differences between the respective weighted values of the respective alternatives to the worst-determined solution data, a diagonal weight matrix obtained from the weight matrix, a transpose of the diagonal weight matrix, and an inverse of the covariance matrix. Example operation 1704 represents determining respective relative closeness values for the respective alternatives based on the respective positive separation values and respective negative separation values. Example operation 1706 represents taking action to perform respective tasks related to the respective virtual machines, the taking action performed in an order that is based on the respective relative closeness values.

Further operations can include ranking the respective alternatives corresponding to the respective virtual machines by the respective relative closeness values to produce a ranked data structure comprising the virtual machine identifiers.

Taking the action can include backing up the respective virtual machines in the order that is based on the respective relative closeness values.

Further operations can include ranking the respective alternatives corresponding to the respective virtual machines by the respective relative closeness values to produce a ranked data structure comprising the respective virtual machine identifiers of the respective virtual machines, and selecting a top-subset of the data structure virtual machines identifiers based on backup constraint data, and wherein the backing up the respective virtual machines can include backing up the respective virtual machines identified in the top-subset, and queuing the virtual machines not identified in the top-subset for subsequent backup.

Taking the action can include shutting down the respective virtual machines in the order that is based on the respective relative closeness values.

Taking the action can include assigning tasks to the respective virtual machines in the order that is based on the respective relative closeness values.

Further operations can include obtaining the criteria from at least one of: user input data or system data.

One or more example aspects, such as corresponding to example operations of a method, are represented in FIG. 18. Example operation 1802 represents ranking, by a system comprising a processor, a group of respective workloads associated with respective virtual machines of a virtualized environment to obtain virtual machine prioritization rankings for the respective virtual machines; the ranking of the group of respective workloads is represented by operations 1804, 1806, 1808 and 1810. Example operation 1804 represents obtaining respective values for respective criterion-respective virtual machine pairings. Example operation 1806 represents processing the respective values to determine respective correlation data between respective pairs of the respective criterion. Example operation 1808 represents determining, based on the respective correlation data, respective relative closeness values for respective virtual machine alternatives that correspond to the respective virtual machines. Example operation 1810 represents ranking the respective virtual machine alternatives by the respective relative closeness values to determine the virtual machine prioritization rankings for the respective virtual machines. Example operation 1812 represents taking, by the system, action to perform respective tasks related to the respective virtual machines, the taking of the action performed in an order that is based on the virtual machine prioritization rankings.

Further operations can include obtaining, by the system, the multiple criteria from user input.

Processing the respective values can include determining pairwise covariant data for respective pairs of the respective criterion.

Processing the respective values to determine the respective correlation data can include generating a covariance matrix comprising respective identifiers of the respective criterion identifiers in a first dimension of the covariance matrix, and the respective identifiers of the respective criterion identifiers in a second dimension of the covariance matrix, the covariance matrix comprising respective variance values determined for matching criterion identifier pairs, and respective covariance values determined for non-matching criterion identifier pairs.

The respective values for the respective criterion-respective virtual machine pairings can include respective first values, and wherein the determining of the respective relative closeness values can include performing Mahalanobis distance determinations based on: respective second values based on respective weights combined with the respective first values, and an inverse of the covariance matrix.

Respective identifiers of the respective virtual machines corresponding to the respective virtual machine alternatives, and the respective relative closeness values, can be arranged in a data structure; the ranking of the respective virtual machine alternatives can include sorting the data structure by the respective relative closeness values.

Taking the action can include backing up the respective virtual machines in the order that is based on the virtual machine prioritization rankings.

Taking the action can include shutting down the respective virtual machines in the order that is based on the virtual machine prioritization rankings.

Taking the action can include assigning tasks to the respective virtual machines in the order that is based on the virtual machine prioritization rankings.

Figure 19:
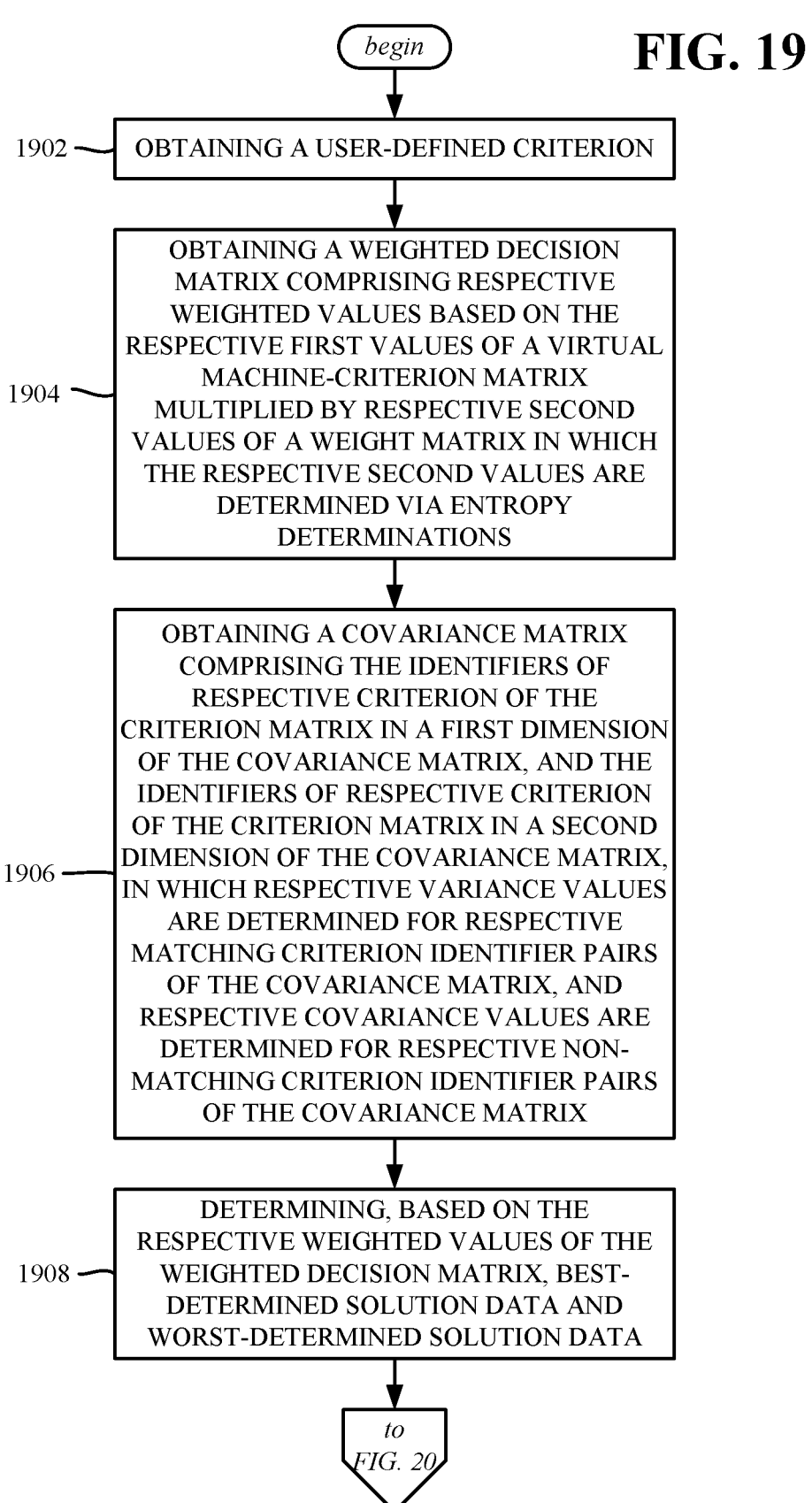

FIGS. 19 and 20 summarize various example operations, e.g., corresponding to a machine-readable medium, comprising executable instructions that, when executed by a processor, facilitate performance of operations. Example operation 1902 of FIG. 12 represents obtaining a user-defined criterion. Example operation 1904 represents obtaining a weighted decision matrix comprising respective weighted values based on the respective first values of a virtual machine-criterion matrix multiplied by respective second values of a weight matrix in which the respective second values are determined via entropy determinations. Example operation 1906 represents obtaining a covariance matrix comprising the identifiers of respective criterion of the criterion matrix in a first dimension of the covariance matrix, and the identifiers of respective criterion of the criterion matrix in a second dimension of the covariance matrix, in which respective variance values are determined for respective matching criterion identifier pairs of the covariance matrix, and respective covariance values are determined for respective non-matching criterion identifier pairs of the covariance matrix. Example operation 1908 represents determining, based on the respective weighted values of the weighted decision matrix, best-determined solution data and worst-determined solution data. The operations continue at FIG. 20, wherein example operation 2002 represents obtaining respective positive separation values and respective negative separation values for respective alternatives corresponding to respective virtual machines identified in the weighted decision matrix, the obtaining of the respective positive separation values and the respective negative separation values comprising performing Mahalanobis distance determinations based on respective first differences between the respective weighted values of the respective alternatives and the best-determined solution data, respective second differences between the respective weighted values of the respective alternatives to the worst-determined solution data, a diagonal weight matrix obtained from the weight matrix, a transpose of the diagonal weight matrix, and an inverse of the covariance matrix. Example operation 2004 represents determining respective relative closeness values for the respective alternatives based on the respective positive separation values and respective negative separation values. Example operation 2006 represents taking action to perform respective tasks related to the respective virtual machines, the taking action performed in an order that is based on the respective relative closeness values.

Further operations can include normalizing the respective first values of virtual machine, criterion matrix into a normalized matrix, and wherein the obtaining of the weighted decision matrix is based on the normalized matrix multiplied by the respective second values of the weight matrix.

Further operations can include obtaining virtual machine prioritization rankings, comprising ranking the respective alternatives corresponding to the respective virtual machines by the respective relative closeness values to produce a ranked data structure of the virtual machine prioritization rankings.

Taking the action can include at least one of: backing up the respective virtual machines in the order that is based on the respective relative closeness values, shutting down the respective virtual machines in the order that is based on the respective relative closeness values, or assigning tasks to the respective virtual machines in the order that is based on the respective relative closeness values.

As can be seen, the technology described herein facilitates and performs intelligent prioritization of VMs, which can be applied to various use cases. Workload prioritization (ranking) is performed based on multi-criteria decision analysis using a Mahalanobis distance-based variance-covariance matrix that takes into account the pairwise correlation between criteria (attributes) from a dataset to produce a near-optimal ranking outcome that represents the prioritization order. The decision engine can be based on machine learning/artificial intelligence, although deep math or ML/AI expertise is not necessarily required.

The use of the distance metric a described herein provides a superior/improved correlation estimate between pairwise decision attributes (criteria) provided by an end user or system. By abstracting the attributes of selection criteria, there can be a straightforward interface provided to an end-user who only needs to specify what criteria to use to prioritize workflows.

FIG. 21 is a schematic block diagram of a computing environment 2100 with which the disclosed subject matter can interact. The system 2100 comprises one or more remote component(s) 2110. The remote component(s) 2110 can be hardware and/or software (e.g., threads, processes, computing devices). In some embodiments, remote component(s) 2110 can be a distributed computer system, connected to a local automatic scaling component and/or programs that use the resources of a distributed computer system, via communication framework 2140. Communication framework 2140 can comprise wired network devices, wireless network devices, mobile devices, wearable devices, radio access network devices, gateway devices, femtocell devices, servers, etc.

The system 2100 also comprises one or more local component(s) 2120. The local component(s) 2120 can be hardware and/or software (e.g., threads, processes, computing devices). In some embodiments, local component(s) 2120 can comprise an automatic scaling component and/or programs that communicate/use the remote resources 2110, etc., connected to a remotely located distributed computing system via communication framework 2140.

One possible communication between a remote component(s) 2110 and a local component(s) 2120 can be in the form of a data packet adapted to be transmitted between two or more computer processes. Another possible communication between a remote component(s) 2110 and a local component(s) 2120 can be in the form of circuit-switched data adapted to be transmitted between two or more computer processes in radio time slots. The system 2100 comprises a communication framework 2140 that can be employed to facilitate communications between the remote component(s) 2110 and the local component(s) 2120, and can comprise an air interface, e.g., Uu interface of a UMTS network, via a long-term evolution (LTE) network, etc. Remote component(s) 2110 can be operably connected to one or more remote data store(s) 2150, such as a hard drive, solid state drive, SIM card, device memory, etc., that can be employed to store information on the remote component(s) 2110 side of communication framework 2140. Similarly, local component(s) 2120 can be operably connected to one or more local data store(s) 2130, that can be employed to store information on the local component(s) 2120 side of communication framework 2140.

Figure 22:
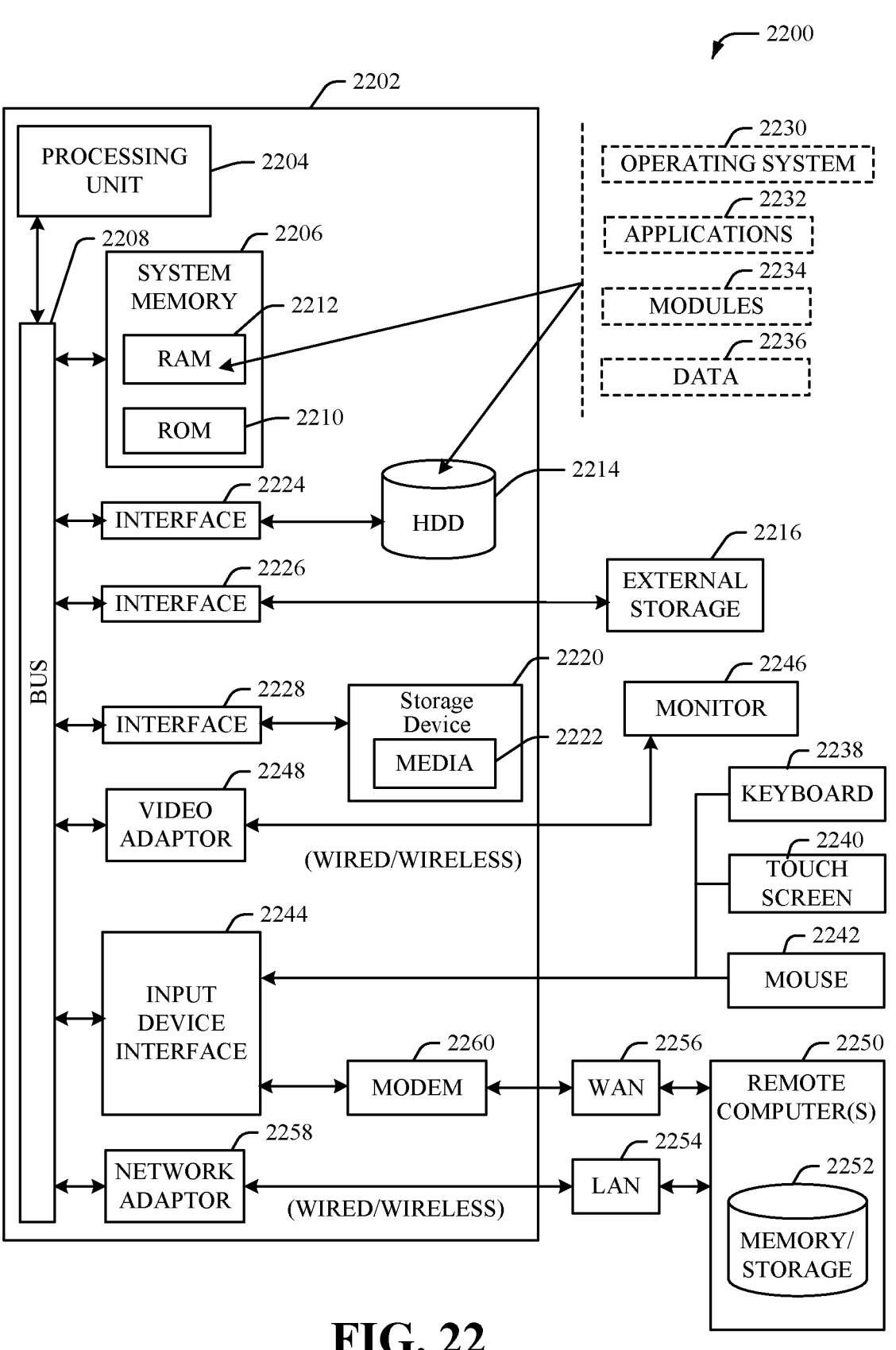
FIG. 22 depicts an example schematic block diagram of a computing environment with which the disclosed subject matter can interact/be implemented at least in part, in accordance with various aspects and implementations of the subject disclosure.

In order to provide additional context for various embodiments described herein, FIG. 22 and the following discussion are intended to provide a brief, general description of a suitable computing environment 2200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 22, the example environment 2200 for implementing various embodiments of the aspects described herein includes a computer 2202, the computer 2202 including a processing unit 2204, a system memory 2206 and a system bus 2208. The system bus 2208 couples system components including, but not limited to, the system memory 2206 to the processing unit 2204. The processing unit 2204 can be any of various commercially available processors. Dual microprocessors and other multi-processor architectures can also be employed as the processing unit 2204.

The system bus 2208 can be any of several types of bus structure that can further interconnect to a memory bus (with or without a memory controller), a peripheral bus, and a local bus using any of a variety of commercially available bus architectures. The system memory 2206 includes ROM 2210 and RAM 2212. A basic input/output system (BIOS) can be stored in a non-volatile memory such as ROM, erasable programmable read only memory (EPROM), EEPROM, which BIOS contains the basic routines that help to transfer information between elements within the computer 2202, such as during startup. The RAM 2212 can also include a high-speed RAM such as static RAM for caching data.

The computer 2202 further includes an internal hard disk drive (HDD) 2214 (e.g., EIDE, SATA), and can include one or more external storage devices 2216 (e.g., a magnetic floppy disk drive (FDD) 2216, a memory stick or flash drive reader, a memory card reader, etc.). While the internal HDD 2214 is illustrated as located within the computer 2202, the internal HDD 2214 can also be configured for external use in a suitable chassis (not shown). Additionally, while not shown in environment 2200, a solid state drive (SSD) could be used in addition to, or in place of, an HDD 2214.

Other internal or external storage can include at least one other storage device 2220 with storage media 2222 (e.g., a solid state storage device, a nonvolatile memory device, and/or an optical disk drive that can read or write from removable media such as a CD-ROM disc, a DVD, a BD, etc.). The external storage 2216 can be facilitated by a network virtual machine. The HDD 2214, external storage device(s) 2216 and storage device (e.g., drive) 2220 can be connected to the system bus 2208 by an HDD interface 2224, an external storage interface 2226 and a drive interface 2228, respectively.

The drives and their associated computer-readable storage media provide nonvolatile storage of data, data structures, computer-executable instructions, and so forth. For the computer 2202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2212, including an operating system 2230, one or more application programs 2232, other program modules 2234 and program data 2236. All or portions of the operating system, applications, modules, and/or data can also be cached in the RAM 2212. The systems and methods described herein can be implemented utilizing various commercially available operating systems or combinations of operating systems.

Computer 2202 can optionally comprise emulation technologies. For example, a hypervisor (not shown) or other intermediary can emulate a hardware environment for operating system 2230, and the emulated hardware can optionally be different from the hardware illustrated in FIG. 22. In such an embodiment, operating system 2230 can comprise one virtual machine (VM) of multiple VMs hosted at computer 2202. Furthermore, operating system 2230 can provide runtime environments, such as the Java runtime environment or the .NET framework, for applications 2232. Runtime environments are consistent execution environments that allow applications 2232 to run on any operating system that includes the runtime environment. Similarly, operating system 2230 can support containers, and applications 2232 can be in the form of containers, which are lightweight, standalone, executable packages of software that include, e.g., code, runtime, system tools, system libraries and settings for an application.

Further, computer 2202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 2202, e.g., applied at the application execution level or at the operating system (OS) kernel level, thereby enabling security at any level of code execution.

A user can enter commands and information into the computer 2202 through one or more wired/wireless input devices, e.g., a keyboard 2238, a touch screen 2240, and a pointing device, such as a mouse 2242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2204 through an input device interface 2244 that can be coupled to the system bus 2208, but can be connected by other interfaces, such as a parallel port, an IEEE 2294 serial port, a game port, a USB port, an IR interface, a BLUETOOTH® interface, etc.

A monitor 2246 or other type of display device can be also connected to the system bus 2208 via an interface, such as a video adapter 2248. In addition to the monitor 2246, a computer typically includes other peripheral output devices (not shown), such as speakers, printers, etc.

The computer 2202 can operate in a networked environment using logical connections via wired and/or wireless communications to one or more remote computers, such as a remote computer(s) 2250. The remote computer(s) 2250 can be a workstation, a server computer, a router, a personal computer, portable computer, microprocessor-based entertainment appliance, a peer device or other common network node, and typically includes many or all of the elements described relative to the computer 2202, although, for purposes of brevity, only a memory/storage device 2252 is illustrated. The logical connections depicted include wired/wireless connectivity to a local area network (LAN) 2254 and/or larger networks, e.g., a wide area network (WAN) 2256. Such LAN and WAN networking environments are commonplace in offices and companies, and facilitate enterprise-wide computer networks, such as intranets, all of which can connect to a global communications network, e.g., the Internet.

When used in a LAN networking environment, the computer 2202 can be connected to the local network 2254 through a wired and/or wireless communication network interface or adapter 2258. The adapter 2258 can facilitate wired or wireless communication to the LAN 2254, which can also include a wireless access point (AP) disposed thereon for communicating with the adapter 2258 in a wireless mode.

When used in a WAN networking environment, the computer 2202 can include a modem 2260 or can be connected to a communications server on the WAN 2256 via other means for establishing communications over the WAN 2256, such as by way of the Internet. The modem 2260, which can be internal or external and a wired or wireless device, can be connected to the system bus 2208 via the input device interface 2244. In a networked environment, program modules depicted relative to the computer 2202 or portions thereof, can be stored in the remote memory/storage device 2252. It will be appreciated that the network connections shown are examples and other means of establishing a communications link between the computers can be used.

When used in either a LAN or WAN networking environment, the computer 2202 can access cloud storage systems or other network-based storage systems in addition to, or in place of, external storage devices 2216 as described above. Generally, a connection between the computer 2202 and a cloud storage system can be established over a LAN 2254 or WAN 2256 e.g., by the adapter 2258 or modem 2260, respectively. Upon connecting the computer 2202 to an associated cloud storage system, the external storage interface 2226 can, with the aid of the adapter 2258 and/or modem 2260, manage storage provided by the cloud storage system as it would other types of external storage. For instance, the external storage interface 2226 can be configured to provide access to cloud storage sources as if those sources were physically connected to the computer 2202.

The computer 2202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one processor; and at least one memory that stores executable instructions that, when executed by the at least one processor, facilitate performance of operations, the operations comprising:

obtaining first matrix data representative of a decision matrix comprising respective first values representative of respective captured data for respective pairs of virtual machines and criteria, the decision matrix comprising virtual machines identifiers for the virtual machines in a first dimension of the decision matrix, and criteria identifiers for the criteria in a second dimension of the decision matrix, wherein the criteria comprise respective use-case tags that associate individual ones of the criteria with at least two distinct control-plane use cases comprising a backup use case, a shutdown use case for an uninterruptible power supply (UPS) event, and a task scheduling use case;

obtaining second matrix data representative of a weight matrix corresponding to the decision matrix, the weight matrix comprising respective second values based on entropy and a normalized version of the respective first values of the decision matrix;

obtaining third matrix data representative of a weighted decision matrix comprising respective weighted values based on the respective first values of the decision matrix multiplied by respective second values of the weight matrix;

obtaining fourth matrix data representative of a covariance matrix comprising the criteria identifiers in a first dimension of the covariance matrix, and the criteria identifiers in a second dimension of the covariance matrix, the covariance matrix comprising respective variance values determined for matching criterion identifier pairs of the criteria and respective covariance values determined for non-matching criterion identifier pairs of the criteria;

determining, based on the weighted values of the weighted decision matrix, best-determined solution data and worst-determined solution data;

obtaining respective positive separation values and respective negative separation values for respective alternatives corresponding to the respective virtual machines, the obtaining of the respective positive separation values and the respective negative separation values comprising performing Mahalanobis distance determinations based on respective first differences between the respective weighted values of the respective alternatives and the best-determined solution data, respective second differences between the respective weighted values of the respective alternatives to the worst-determined solution data, a diagonal weight matrix obtained from the weight matrix, a transpose of the diagonal weight matrix, and an inverse of the covariance matrix;

determining respective relative closeness values for the respective alternatives based on the respective positive separation values and respective negative separation values; and taking action to perform respective tasks related to the respective virtual machines, the taking of the action performed in an order that is based on the respective relative closeness values, the taking of the action being performed via a backup server, a UPS network shutdown module, and a task or workflow scheduler, the taking of the action being configured to modify operation of a virtualized computing infrastructure by reducing at least one backup-window overrun, preventing exhaustion of UPS battery capacity before at least one higher-priority workload is shut down, and reducing task scheduling latency under at least one resource constraint, and the taking of the action comprising:

for the backup use case, selecting a first subset of the respective virtual machines based on the respective relative closeness values and on a backup-capacity constraint corresponding to a number of parallel backup jobs supported by a backup proxy server, initiating backup operations for the first subset, resulting in initiated backup operations, and queuing remaining ones of the respective virtual machines for subsequent backup, thereby reducing backup-window overruns relative to a non-prioritized backup policy, for the shutdown use case, selecting a second subset of the respective virtual machines based on the respective relative closeness values and on a UPS time-remaining constraint corresponding to estimated remaining battery capacity, and initiating graceful shutdown operations for the second subset before expiration of the UPS time-remaining constraint, thereby reducing a likelihood of data loss due to abrupt power loss, for the task scheduling use case, selecting a third subset of the respective virtual machines based on the respective relative closeness values and on at least one performance-based scheduling constraint corresponding to available compute resources, and assigning new workloads to the third subset ahead of virtual machines having lower respective relative closeness values, thereby reducing task scheduling latency and resource contention, and for at least one use case of the backup use case, the shutdown use case, or the task scheduling use case, obtaining feedback indicative of completion success or failure for the initiated backup operations, shutdown operations, or task assignments, and updating at least one of: the criteria or the respective second values of the weight matrix used in obtaining the second matrix data, based on the feedback for the at least one use case, resulting in updated criteria or updated respective second values, and re-executing the obtaining, the determining and the taking of the action for the at least one use case using the updated criteria or the updated respective second values, wherein the virtualized computing infrastructure is adaptively controlled over time.

2. The system of claim 1, wherein the operations further comprise ranking the respective alternatives corresponding to the respective virtual machines by the respective relative closeness values for each of the control-plane use cases to produce respective ranked data structures comprising the virtual machine identifiers and respective use-case tags that identify the control-plane use case for which the respective relative closeness values are computed.

3. The system of claim 1, wherein the taking of the action further comprises backing up the respective virtual machines in the order that is based on the respective relative closeness values from the ranked data structure for the backup use case.

4. The system of claim 3, wherein the operations further comprise ranking the respective alternatives corresponding to the respective virtual machines by the respective relative closeness values to produce a ranked data structure comprising the respective virtual machine identifiers of the respective virtual machines, and selecting a top-subset of the data structure comprising the virtual machines identifiers based on backup constraint data, and wherein the backing up the respective virtual machines comprises backing up the respective virtual machines identified in the top-subset, and queuing the virtual machines not identified in the top-subset for subsequent backup responsive to a dynamic backup capacity constraint of a backup proxy server.

5. The system of claim 1, wherein the taking of the action further comprises shutting down the respective virtual machines in the order that is based on the respective relative closeness values from the ranked data structure for the shutdown use case.

6. The system of claim 1, wherein the taking of the action further comprises assigning tasks to the respective virtual machines in the order that is based on the respective relative closeness values from the ranked data structure for the task scheduling use case.

7. The system of claim 1, wherein the operations further comprise obtaining the criteria from at least one of: user input data or system data via a criteria selection interface that associates the criteria with the use-case tags.

8. A method, comprising:

ranking, by a system comprising a processor, a group of respective workloads associated with respective virtual machines of a virtualized environment to obtain virtual machine prioritization rankings for the respective virtual machines, the ranking of the group of respective workloads comprising:

obtaining respective values for respective criterion and respective virtual machine pairings, the respective criterion being part of criteria that are associated with respective use-case tags that associate individual ones of the criteria with at least two distinct control-plane use cases comprising a backup use case, a shutdown use case for an uninterruptible power supply (UPS) event, and a task scheduling use case, processing the respective values to determine respective correlation data between respective pairs of the respective criterion, determining, based on the respective correlation data, respective relative closeness values for respective virtual machine alternatives that correspond to the respective virtual machines, and ranking the respective virtual machine alternatives by the respective relative closeness values to determine the virtual machine prioritization rankings for the respective virtual machines; and taking, by the system, action to perform respective tasks related to the respective virtual machines, the taking of the action performed in an order that is based on the virtual machine prioritization rankings, the taking of the action being performed by at least one of a backup server, a UPS network shutdown module, or a task or workflow scheduler, the taking of the action being configured to increase a metric associated with operation of a virtualized computing infrastructure by reducing at least one backup-window overrun, preventing exhaustion of a UPS battery capacity before higher-priority workloads are shut down, and reducing task scheduling latency under at least one resource constraint, and the taking of the action comprising:

for the backup use case, selecting a first subset of the respective virtual machines from the virtual machine prioritization rankings based on the respective relative closeness values and on a backup-capacity constraint corresponding to a number of parallel backup jobs supported by a backup proxy server, initiating backup operations for the first subset, and queuing remaining ones of the respective virtual machines for subsequent backup, for the shutdown use case, selecting a second subset of the respective virtual machines from the virtual machine prioritization rankings based on the respective relative closeness values and on a UPS time-remaining constraint corresponding to estimated remaining battery capacity, and initiating respective graceful shutdown operations for the second subset before expiration of the UPS time-remaining constraint, for the task scheduling use case, selecting a third subset of the respective virtual machines from the virtual machine prioritization rankings based on the respective relative closeness values and based on at least one performance-based scheduling constraint corresponding to available compute resources, and assigning at least one new workload to the third subset ahead of virtual machines having lower respective relative closeness values, and for at least one use case of the backup use case, the shutdown use case, or the task scheduling use case, obtaining feedback indicative of completion success or failure for the backup operations, the at least one shutdown operation, or at least one task assignment, and updating at least one of: the respective values or weights for one or more of the criteria associated with the use-case tag for the at least one use case based on the feedback, resulting in updated respective values or weights and re-performing the ranking for the at least one use case using the updated respective values or weights, as a result of which the virtual machine prioritization rankings are adaptively changed over time.

9. The method of claim 8, further comprising obtaining, by the system, the criteria from user input via a criteria selection interface that associates the criteria with the respective use-case tags.

10. The method of claim 8, wherein the processing of the respective values comprises determining pairwise covariant data for respective pairs of the respective criterion for a given one of the control-plane use cases.

11. The method of claim 8, wherein the processing of the respective values to determine the respective correlation data comprises generating a covariance matrix comprising respective identifiers of the respective criterion identifiers in a first dimension of the covariance matrix, and the respective identifiers of the respective criterion identifiers in a second dimension of the covariance matrix, the covariance matrix comprising respective variance values determined for matching criterion identifier pairs, and respective covariance values determined for non-matching criterion identifier pairs for a selected one of the control-plane use cases.

12. The method of claim 8, wherein the respective values for the respective criterion-respective virtual machine pairings comprises respective first values, and wherein the determining of the respective relative closeness values comprises performing Mahalanobis distance determinations based on: respective second values based on respective weights combined with the respective first values, and an inverse of the covariance matrix.

13. The method of claim 8, wherein respective identifiers of the respective virtual machines corresponding to the respective virtual machine alternatives, and the respective relative closeness values, are arranged in a data structure, and wherein the ranking of the respective virtual machine alternatives comprises sorting the data structure by the respective relative closeness values.

14. The method of claim 8, wherein the taking of the action further comprises backing up the respective virtual machines in the order that is based on the virtual machine prioritization rankings.

15. The method of claim 8, wherein the taking of the action further comprises shutting down the respective virtual machines in the order that is based on the virtual machine prioritization rankings.

16. The method of claim 8, wherein the taking of the action further comprises assigning tasks to the respective virtual machines in the order that is based on the virtual machine prioritization rankings.

17. A non-transitory machine-readable medium, comprising executable instructions that, when executed by a processor, facilitate performance of operations, the operations comprising:

obtaining a plurality of user-defined criteria and respective use-case tags that associate individual ones of the criteria with at least two distinct control-plane use cases comprising a backup use case, a shutdown use case for an uninterruptible power supply (UPS) event, and a task scheduling use case;

obtaining a weighted decision matrix comprising respective weighted values based on the respective first values of a virtual machine-criterion matrix multiplied by respective second values of a weight matrix in which the respective second values are determined via entropy determinations;

obtaining a covariance matrix comprising identifiers of respective criterion of the criterion matrix in a first dimension of the covariance matrix, and the identifiers of the respective criterion of the criterion matrix in a second dimension of the covariance matrix, in which respective variance values are determined for respective matching criterion identifier pairs of the covariance matrix, and respective covariance values are determined for respective non-matching criterion identifier pairs of the covariance matrix;

determining, based on the respective weighted values of the weighted decision matrix, best-determined solution data and worst-determined solution data;

obtaining respective positive separation values and respective negative separation values for respective alternatives corresponding to respective virtual machines identified in the weighted decision matrix, the obtaining of the respective positive separation values and the respective negative separation values comprising performing Mahalanobis distance determinations based on respective first differences between the respective weighted values of the respective alternatives and the best-determined solution data, respective second differences between the respective weighted values of the respective alternatives to the worst-determined solution data, a diagonal weight matrix obtained from the weight matrix, a transpose of the diagonal weight matrix, and an inverse of the covariance matrix;

determining respective relative closeness values for the respective alternatives based on the respective positive separation values and respective negative separation values; and taking action to perform respective tasks related to the respective virtual machines, the taking of the action performed in an order that is based on the respective relative closeness values, the taking of the action comprising controlling, by at least a backup server, a UPS network shutdown module, and a task or workflow scheduler, a virtualized computing infrastructure to improve at least backup-window performance according to a defined performance metric, a UPS-event data protection, and task scheduling latency under resource constraints, and the taking of the action further comprising:

selecting, for the backup use case, a first subset of the respective virtual machines based on the respective relative closeness values and on a backup-capacity constraint corresponding to a number of parallel backup jobs supported by a backup proxy server, initiating backup operations for the first subset, and queuing remaining ones of the respective virtual machines for subsequent backup, selecting, for the shutdown use case, a second subset of the respective virtual machines based on the respective relative closeness values and on a UPS time-remaining constraint corresponding to estimated remaining battery capacity, and initiating graceful shutdown operations for the second subset before expiration of the UPS time-remaining constraint, selecting, for the task scheduling use case, a third subset of the respective virtual machines based on the respective relative closeness values and based on at least one performance-based scheduling constraint corresponding to available compute resources, and assigning new workloads to the third subset ahead of virtual machines having lower respective relative closeness values, and for at least one use case of the backup use case, the shutdown use case, and the task scheduling use case, obtaining feedback indicative of completion success or failure for the corresponding backup operations, shutdown operations, or task assignments, and updating at least one of: the identifiers of the respective criterion of the criterion matrix or the respective second values of the weight matrix based on the feedback, and re-performing the determining and obtaining operations for that at least one use case using the updated identifiers or respective second values, as a result of which the taking of the action adaptively changes over time.

18. The non-transitory machine-readable medium of claim 17, wherein the operations further comprise normalizing the respective first values of virtual machine, the criterion matrix into a normalized matrix, and wherein the obtaining of the weighted decision matrix is based on the normalized matrix multiplied by the respective second values of the weight matrix.

19. The non-transitory machine-readable medium of claim 17, wherein the operations further comprise obtaining virtual machine prioritization rankings, comprising ranking the respective alternatives corresponding to the respective virtual machines by the respective relative closeness values to produce a ranked data structure of the virtual machine prioritization rankings for at least one of the backup use case, the shutdown use case, and the task scheduling use case.

20. The non-transitory machine-readable medium of claim 17, wherein the taking of the action further comprises at least one of: backing up the respective virtual machines in the order that is based on the respective relative closeness values, shutting down the respective virtual machines in the order that is based on the respective relative closeness values, or assigning tasks to the respective virtual machines in the order that is based on the respective relative closeness values.

* * * * *